United States Patent

[11] 3,619,331

[72] Inventor Gregory Grosbard
Long Beach, N.Y.

[21] Appl. No. 854,126
[22] Filed Aug. 29, 1969
[45] Patented Nov. 9, 1971
[73] Assignee International Research Development, Inc.

[54] CODE PUNCH RECORDING SYSTEM
10 Claims, 5 Drawing Figs.

[52] U.S. Cl. .......... 156/510, 234/109, 234/131, 156/250
[51] Int. Cl. .......... B32b 31/18, B32b 31/10, B26f 1/00
[50] Field of Search .......... 156/510, 250, 297, 517, 518, 520; 234/109, 131

[56] References Cited

UNITED STATES PATENTS

| | | | |
|---|---|---|---|
| 2,972,428 | 2/1961 | Dubbs | 156/518 X |
| 2,999,632 | 9/1961 | Tailleur | 234/109 |
| 3,507,726 | 4/1970 | Crew | 156/584 |
| 3,357,354 | 12/1967 | Brynko | 101/472 |

*Primary Examiner*—Benjamin A. Borchelt
*Assistant Examiner*—James V. Doramus
*Attorneys*—Clarence A. O'Brien and Harvey B. Jacobson

ABSTRACT: Portions of magnetic tape are transferred to data processing cards by a code punching device. The tape is fed past the punch closely spaced from the card in response to a signal input causing reciprocation of the punch thereby transferring punched out portions of the tape to the cards. A pressure activated adhesive coating the cards firmly holds the punched out tape portions on the cards.

Gregory Grosbard
INVENTOR.

BY Clarence A. O'Brien and Harvey B. Jacobson
Attorneys

CODE PUNCH RECORDING SYSTEM

This invention relates to the transfer of encoded information to data processing cards.

Coded information is generally recorded on data processing cards by code punching devices which punch out small apertures in the cards at locations selected in accordance with signal inputs. The amount of information capable of being recorded in this manner is limited while readout of the coded information requires apparatus capable of recognizing or sensing the presence of apertures in the cards. More rapid readout by magnetic types of readout devices is thereby precluded.

It is therefore an important object of the present invention to provide a system for recording coded information on data processing cards so that more rapid readout may be effected by reading apparatus which may sense both faces of the card thereby also increasing the quantity of information capable of being recorded on the cards. Magnetic reading apparatus capable of sensing data on both faces of a data processing card is disclosed, for example, in my prior copending application, U.S. Ser. No. 820,997, filed May 1, 1969.

In accordance with the present invention, the foregoing objectives are achieved in an economical fashion by utilizing a code punching device modified with respect to the support and movement of the data processing cards and feeding of a magnetic tape in operative relation thereto in order to transfer portions of the magnetic tape to the card without any punching of apertures in the card. The cards may accordingly be coated on both faces with a pressure activated adhesive so that the punched out portions of the tape will adhere thereto.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1:
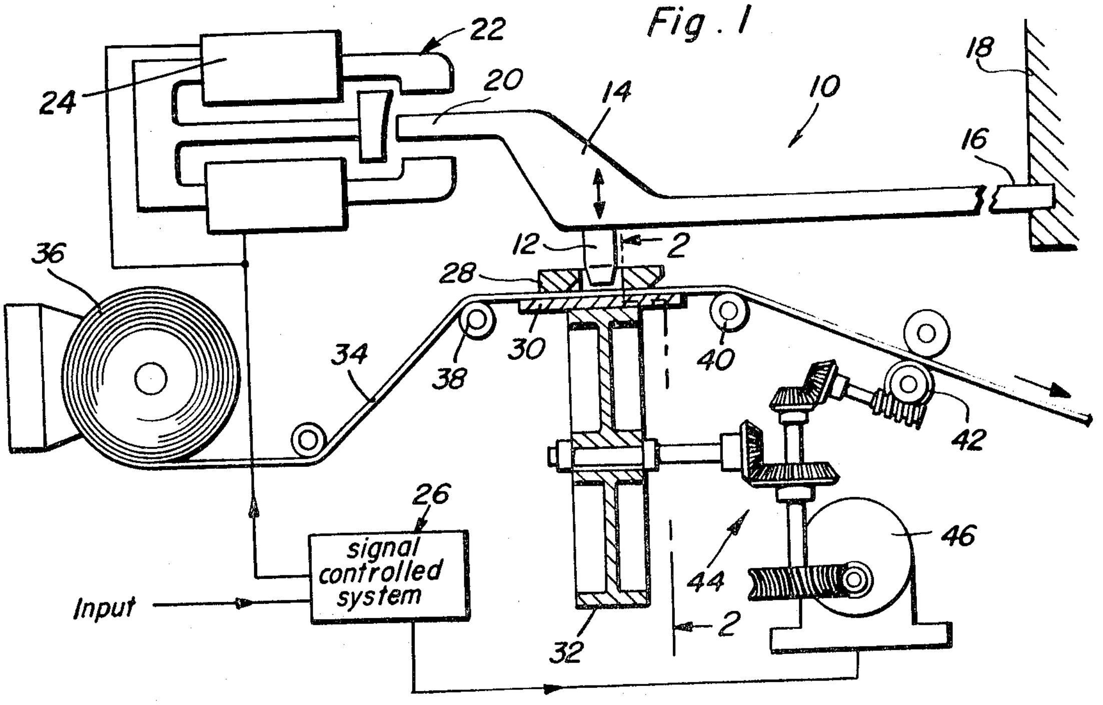
FIG. 1 is a schematic illustration of the apparatus associated with the present invention.

Referring now to the drawings in detail, FIG. 1 illustrates a code punch mechanism 10 of any suitable form such as disclosed in U.S. Pat. No. 2,999,632, to Tailleur, by means of which reciprocatory movement is imparted to a punch element 12 through a relatively short stroke in response to a signal input. While various punch mechanisms may be utilized, by way of example only, the punch element 12 is mounted on a punch body 14 having an anchored end 16 secured to a fixed support 18 and an armature end 20 positioned between the pole faces of a magnet 22 under control of a pair of electromagnetic coils 24. Thus, a signal input to a signal controlled system 26 of any suitable type pulses the electromagnetic coils 24 in order to cause reciprocation of the punch element 12 for code recording purposes.

Figure 2:
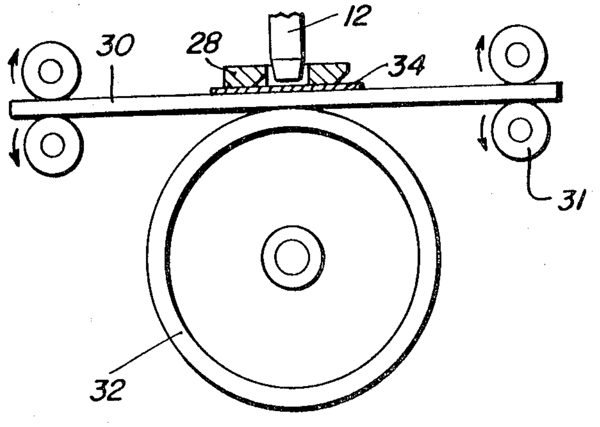
FIG. 2 is a partial sectional view taken substantially through a plane indicated by section line 2—2 in FIG. 1.

The punch element 12 is reciprocated through a stripper die 28 toward data processing cards 30 when disposed in a recording position between appropriately spaced guide rollers 31 as shown in FIG. 2 for example. In accordance with the present invention, the usual code punch mechanism is modified so that guide rollers position the data processing cards 30, in the embodiment shown, in contact with the annular rim of a supporting feed drum 32. When so positioned, the data processing card will be close to but spaced from the punch element 12 at the end of its stroke so that no aperture will be punched out of the card as in the case of the usual code punching device disclosed in U.S. Pat. No. 2,999,632 aforementioned. Instead, the punch element 12 will punch out a portion of an elongated web or tape 34 closely spaced from the card and separating the card from the punch element.

The tape may be fed along a path transverse to or perpendicular to the direction in which the data processing cards are fed by the drum 32. Accordingly, the tape may be withdrawn from a storage roll 36 and guided past the recording position by the guide rolls 38 and 40. Further, the tape is advanced by means of a feed roll 42 at a linear speed synchronized to the movement of the data processing cards toward and away from the recording position by means of any suitable synchronizing drive assembly generally referred to by reference numeral 44 in FIG. 1. A drive motor 46 is drivingly connected to the drive assembly in order to impart movement to the feed drum 32 and the tape feed roll 42 in response to signal inputs under control of the signal control system 26 aforementioned. Thus, following reciprocation of the punch element 12 in response to a signal input, movement will be imparted to the feed drum 32 in order to advance the card 30 and through the feed roll 42 advance the tape so that another portion thereof may be transferred to the card during the next reciprocatory stroke of the punch element 12.

Figure 3:
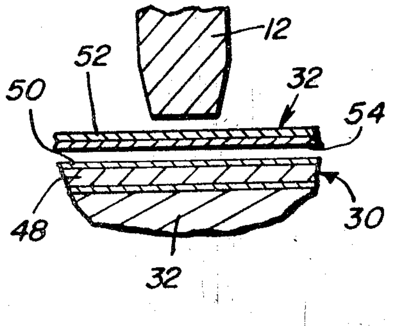
FIGS. 3, 4 and 5 are enlarged partial sectional views showing the operational sequence associated with the recording of coded information in accordance with the present invention.
Figure 4:
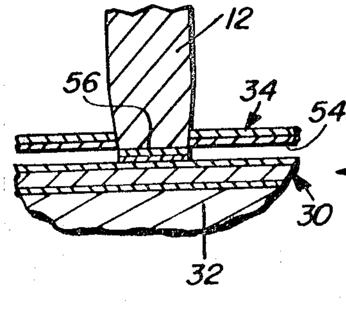
Figure 5:
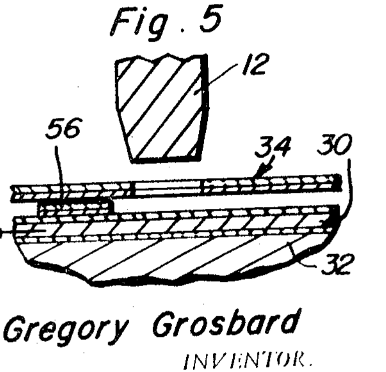

Referring now to FIG. 3, it will be noted that the tape or web 34 is closely spaced from the data processing card 30 supported on the surface of the drum 32 in the momentarily stationary recording position. The data processing card is made of a nonconductive body 48 both faces of which are coated with a pressure activated adhesive 50 so that coded information may be recorded on either or both sides of the card. The tape 34 on the other hand is made of a material 52 containing a recording medium such as magnetic ink or metallic powders capable of being readily sensed by a reading apparatus. One side of the web or tape 34 is coated with an adhesive activating agent 54 confronting the coated surface of the card 30. Thus, when the punch element is reciprocated through its stroke intersecting the web 34 as shown in FIG. 4, a portion 56 of the web is punched out and transferred to the card 30. The pressure of the punch element 12 and activating agent in the coating 54 activates the adhesive 50 so that the punched out portion 56 of the web 34 is firmly held on the card 30 and carried away therewith from the recording position as shown in FIG. 5.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. In combination with a code punching device having a signal controlled punch element reciprocated through a predetermined stroke, means for recording information on data processing cards comprising an elongated web made of a recording material, means for guiding movement of the web along a path intersected by the punch element at one end of said stroke, means for supporting the data processing card in a recording position receiving the recording material transferred thereto from the web by the punch element at the end of said stroke, and means for moving the web and card relative to each other after transfer of the recording material from the web to the data processing card.

2. The combination of claim 1 wherein said data processing card is coated with an adhesive activated by pressure applied thereto by the punch element.

3. The combination of claim 2 wherein said web is coated on one side by an adhesive activating agent.

4. The combination of claim 3 wherein said web constitutes a magnetic tape from which portions are punched by the punch element and transferred to the data processing card.

5. The combination of claim 4 including synchronizing drive means for moving the card to said recording position in transverse relation to said movement of the web.

6. In combination with a code punching device having a signal controlled punch element reciprocated through a predetermined stroke, means for recording information on data processing cards comprising an elongated web made of a recording material, means for guiding movement of the web along a path intersected by the punch element at one end of said stroke, means for supporting the data processing card in a recording position separated from the punch element by the web, and means for moving the web relative to said recording position in response to reciprocation of the punch element transferring recording material from the web to the data processing card, said web constituting a magnetic tape from which portions are punched by the punch element and transferred to the data processing card.

7. The combination of claim 6 including synchronizing drive means for moving the card to said recording position in transverse relation to said movement of the web.

8. The combination of claim 1 including synchronizing drive means for moving the card to said recording position in transverse relation to said movement of the web.

9. In combination with a punch element reciprocated through a predetermined stroke, a magnetic tape, means for guiding movement of the tape along a path intersected by the punch element at the end of said stroke to punch out a portion of the tape, a data processing card to which the punched-out portion of the tape is transferred by the punch element and means supporting the card in a position spaced from the punch element for contact of the punched-out portion of the tape with the card at said end of the stroke of the punch element.

10. The combination of claim 9 wherein the tape is coated with an adhesive activated upon contact with the card.

* * * * *